United States Patent
Lee et al.

(10) Patent No.: US 10,425,557 B2
(45) Date of Patent: Sep. 24, 2019

(54) FREQUENCY-ADAPTIVE DESCREENING METHOD AND DEVICE FOR PERFORMING SAME

(71) Applicant: Samsung Electronics Co., Ltd., Gyeonggi-do (KR)

(72) Inventors: Hyun-seung Lee, Seoul (KR); Ji-young Yi, Gyeonggi-do (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 15/543,784

(22) PCT Filed: Jan. 14, 2016

(86) PCT No.: PCT/KR2016/000404
§ 371 (c)(1),
(2) Date: Jul. 14, 2017

(87) PCT Pub. No.: WO2016/114606
PCT Pub. Date: Jul. 21, 2016

(65) Prior Publication Data
US 2018/0013922 A1 Jan. 11, 2018

(30) Foreign Application Priority Data
Jan. 14, 2015 (KR) .................. 10-2015-0007060

(51) Int. Cl.
*H04N 1/40* (2006.01)
*H04N 1/405* (2006.01)
(Continued)

(52) U.S. Cl.
CPC ......... *H04N 1/40075* (2013.01); *G06T 5/002* (2013.01); *G06T 5/10* (2013.01);
(Continued)

(58) Field of Classification Search
CPC ...... H04N 1/40075; H04N 1/40; H04N 1/405; H04N 1/52; G06T 7/11; G06T 5/20; G06T 2207/10024; G06T 2207/30176
(Continued)

(56) References Cited

U.S. PATENT DOCUMENTS 6,839,152 B2  1/2005  Fan et al.
6,943,808 B2  9/2005  Hains et al.
(Continued)

FOREIGN PATENT DOCUMENTS

EP  1 379 074  6/2008
KR  1020110032157  3/2011
KR  1020120049893  5/2012

OTHER PUBLICATIONS

International Search Report dated Apr. 21, 2016 issued in counterpart application No. PCT/KR2016/000404, 23 pages.

*Primary Examiner* — Quang N Vo
(74) *Attorney, Agent, or Firm* — The Farrell Law Firm, P.C.

(57) ABSTRACT

A frequency adaptive descreening method includes obtaining a scan image of an original document, dividing a region of the scan image by analyzing frequency characteristics of the obtained scan image, estimating a resolution with respect to each of regions resulting from dividing the region according to the analyzed frequency characteristics, and adaptively performing filtering on the regions resulting from dividing the region by using the estimated resolution.

9 Claims, 14 Drawing Sheets

(51) Int. Cl.
*H04N 1/52* (2006.01)
*G06T 5/20* (2006.01)
*G06T 7/11* (2017.01)
*G06T 5/00* (2006.01)
*G06T 5/10* (2006.01)

(52) U.S. Cl.
CPC ............... *G06T 5/20* (2013.01); *G06T 7/11* (2017.01); *H04N 1/40* (2013.01); *H04N 1/405* (2013.01); *H04N 1/52* (2013.01); *G06T 2207/10008* (2013.01); *G06T 2207/10024* (2013.01); *G06T 2207/20012* (2013.01); *G06T 2207/30176* (2013.01)

(58) Field of Classification Search
USPC ........................ 358/3.08, 1.9, 1.15
See application file for complete search history.

(56) References Cited

U.S. PATENT DOCUMENTS

| | | | |
|---|---|---|---|
| 7,043,078 B2 | 5/2006 | Guleryuz | |
| 7,116,446 B2 | 10/2006 | Maurer | |
| 7,581,798 B2* | 9/2009 | Arazaki | B41J 29/393 347/12 |
| 8,395,708 B2 | 3/2013 | Lee et al. | |
| 2005/0179948 A1 | 8/2005 | Curry et al. | |
| 2005/0276505 A1 | 12/2005 | Raveendran | |
| 2006/0227382 A1 | 10/2006 | Ng et al. | |
| 2007/0146794 A1* | 6/2007 | Ahmed | G06K 15/02 358/3.06 |
| 2009/0003723 A1* | 1/2009 | Kokemohr | G06T 5/002 382/261 |
| 2009/0174909 A1 | 7/2009 | Li et al. | |
| 2014/0147057 A1* | 5/2014 | Zhai | G06T 5/20 382/266 |

* cited by examiner

FIG. 5

| 1 | 1 | 1 | 1 | 1 | 1 | 1 | 1 | 1 | 1 | 1 | 1 | 1 | 1 | 1 | 1 |
|---|---|---|---|---|---|---|---|---|---|---|---|---|---|---|---|
| 1 | 1 | 1 | 1 | 1 | 1 | 1 | 1 | -1 | -1 | -1 | -1 | -1 | -1 | -1 | -1 |
| 1 | 1 | 1 | 1 | -1 | -1 | -1 | -1 | -1 | -1 | -1 | -1 | 1 | 1 | 1 | 1 |
| 1 | 1 | 1 | 1 | -1 | -1 | -1 | 1 | 1 | 1 | 1 | 1 | -1 | -1 | -1 | -1 |
| 1 | 1 | -1 | -1 | -1 | -1 | 1 | 1 | 1 | 1 | 1 | -1 | -1 | -1 | 1 | 1 |
| 1 | 1 | -1 | -1 | -1 | 1 | 1 | -1 | -1 | -1 | 1 | 1 | 1 | 1 | -1 | -1 |
| 1 | 1 | -1 | -1 | 1 | 1 | -1 | -1 | -1 | -1 | 1 | 1 | -1 | -1 | 1 | 1 |
| 1 | 1 | -1 | -1 | 1 | 1 | -1 | -1 | 1 | 1 | -1 | -1 | 1 | 1 | -1 | -1 |
| 1 | -1 | -1 | 1 | 1 | -1 | -1 | 1 | 1 | -1 | -1 | 1 | 1 | -1 | -1 | 1 |
| 1 | -1 | -1 | 1 | 1 | -1 | -1 | 1 | 1 | -1 | 1 | -1 | -1 | 1 | 1 | -1 |
| 1 | -1 | -1 | 1 | -1 | 1 | 1 | -1 | -1 | 1 | 1 | -1 | 1 | -1 | -1 | 1 |
| 1 | -1 | -1 | 1 | -1 | 1 | 1 | -1 | 1 | -1 | -1 | 1 | -1 | 1 | 1 | -1 |
| 1 | -1 | 1 | -1 | -1 | 1 | -1 | 1 | 1 | 1 | -1 | -1 | 1 | -1 | 1 | 1 |
| 1 | -1 | 1 | -1 | -1 | 1 | -1 | 1 | -1 | 1 | -1 | 1 | 1 | -1 | 1 | -1 |
| 1 | -1 | 1 | -1 | 1 | -1 | 1 | -1 | -1 | 1 | -1 | 1 | -1 | 1 | -1 | 1 |
| 1 | -1 | 1 | -1 | 1 | -1 | 1 | -1 | 1 | -1 | 1 | -1 | 1 | -1 | 1 | -1 |

| | | | | | | | | | | | | | | |
|---|---|---|---|---|---|---|---|---|---|---|---|---|---|---|
|46|3|39|32|63|20|15|37|15|10|9|13|43|10|6|
|2|35|26|5|3|25|2|18|67|53|3|7|3|14|9|1|
|15|7|7|5|13|3|73|58|23|13|18|7|7|7|7|3|
|24|5|7|10|4|3|8|5|8|2|2|3|3|5|4|4|
|1|0|7|6|16|17|3|1|2|2|4|8|2|2|1|4|
|16|10|13|2|17|25|14|1|4|7|10|13|7|7|1|5|
|11|31|22|26|17|37|21|17|10|3|18|16|3|0|10|10|
|38|39|52|42|29|27|19|4|2|4|3|15|14|9|11|2|
|35|31|24|13|27|29|6|3|2|4|8|2|12|13|9|1|
|22|31|14|2|23|32|3|4|22|22|1|1|6|10|7|3|
|17|23|3|6|23|33|24|20|1|7|10|2|3|8|4|5|
|13|15|5|7|8|0|7|6|5|9|0|2|4|1|4|2|
|4|4|4|3|6|0|1|3|2|0|2|1|0|2|1|2|
|18|10|5|5|16|19|5|5|4|2|3|5|0|0|3|5|
|7|11|3|3|19|14|3|7|6|4|0|0|2|3|1|1|
|9|3|2|0|2|7|2|4|5|1|1|0|1|2|0|7|

FIG. 10
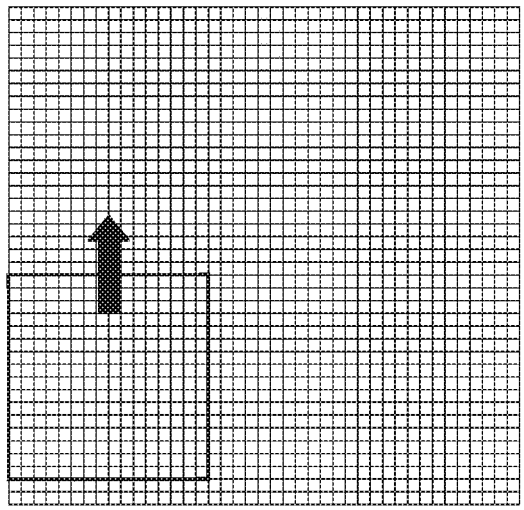
MOVE EACH PIXEL BY ONE
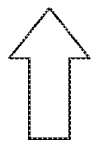
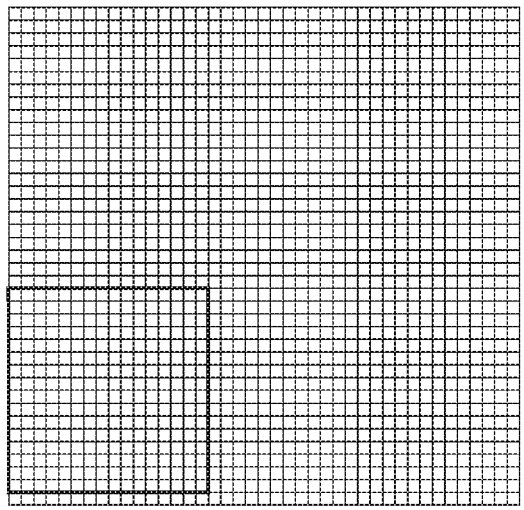

INPUT IMAGE  DESCREENING  OUTPUT IMAGE

FREQUENCY-ADAPTIVE DESCREENING METHOD AND DEVICE FOR PERFORMING SAME

PRIORITY

This application is a National Phase Entry of PCT International Application No. PCT/KR2016/000404, which was filed on Jan. 14, 2016, and claims priority to Korean Patent Application No. 10-2015-0007060, which was filed on Jan. 14, 2015, the contents of each of which are incorporated herein by reference.

TECHNICAL FIELD

The present disclosure relates to methods and apparatuses for copying a document including a halftone pattern.

BACKGROUND ART

Printers use a halftone pattern to express brightness when they print an image. In other words, printers express an image by printing out a plurality of dots on paper. In this regard, expressing brightness and medium density of the image according to how densely the dots are printed on a certain portion by adjusting the number of dots is referred to as halftoning, and a pattern formed as such is referred to as a halftone pattern.

In a case where an original document printed by a printer and including a halftone pattern is copied, if a scan image is obtained by optically scanning the original document, and halftoning is performed on the obtained scan image according to a resolution of a photocopier, a final output document may have a moiré phenomenon due to halftoning frequency interference between the printer, which has printed the original document, and the photocopier.

Accordingly, in order to prevent such a moiré phenomenon occurring, work for removing a halftone pattern included in a scan image, that is, descreening work, is performed before halftoning is performed on the scan image according to a resolution of a photocopier. However, when descreening work is uniformly performed without taking frequency characteristics of the halftone pattern into account, the halftone pattern may not be properly removed, and thus, the moiré phenomenon may occur.

DETAILED DESCRIPTION OF THE INVENTION

Technical Problem

Provided are descreening methods, and more particularly, methods of adaptively removing a halftone pattern included in a scan image obtained by optically scanning a print document according to frequency characteristics and apparatuses for performing the methods.

Technical Solution

A region is divided according to frequency characteristics of a scan image of an original document, and filtering is adaptively performed on divided regions by using a resolution that is estimated through analysis of the frequency characteristics.

Advantageous Effects of the Invention

When a print document is copied, a moiré phenomenon may be prevented from occurring due to halftoning frequency interference between a printer, which has printed a document, and a photocopier.

DESCRIPTION OF THE DRAWINGS

FIG. 5 shows a 16×16 Hadamard matrix for performing Hadamard transformation on a scan image in a frequency adaptive descreening method according to an embodiment.

FIGS. 7 to 9 show frequency characteristic values in a Hadamard space for each of RGB channels.

FIG. 10 shows movement of a pixel unit for performing frequency adaptive descreening, according to an embodiment.

BEST MODE

According to an aspect of an embodiment, a frequency adaptive descreening method includes obtaining a scan image of an original document, dividing a region of the scan image by analyzing frequency characteristics of the obtained scan image, estimating a resolution with respect to each of regions resulting from dividing the region according to the analyzed frequency characteristics, and adaptively performing filtering on the regions resulting from dividing the region by using the estimated resolution.

According to an aspect of another embodiment, an image forming apparatus includes a scan unit for obtaining a scan image by scanning a document, a control unit for processing the scan image and transmitting the scan image to a print unit to request printing, and the print unit for printing the scan image processed by the control unit, wherein the control unit is configured to perform descreening on the scan image according to frequency characteristics of the scan image, perform, according to a resolution supported by the print unit, halftoning on the scan image on which the descreening has been performed, and then, transmit the scan image to the print unit.

MODE OF THE INVENTION

Hereinafter, embodiments will be described in detail with reference to the accompanying drawings. A detailed description of matters widely known to those of ordinary skill in the art will be omitted to clearly describe features of the present embodiments.

Figure 1:
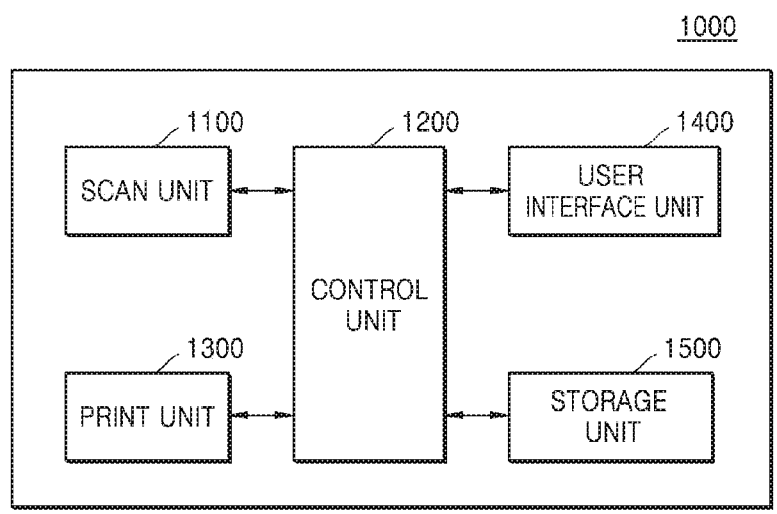
FIG. 1 shows an image forming apparatus for performing frequency adaptive descreening, according to an embodiment.

FIG. 1 shows an image forming apparatus 1000 for performing frequency adaptive descreening according to an embodiment. Referring to FIG. 1, the image forming apparatus 1000 according to the present embodiment may include a scan unit 1100, a control unit 1200, a print unit 1300, a user interface unit 1400, and a storage unit 1500.

The scan unit 1100 obtains a scan image by optically scanning a document and transmits the obtained scan image to the control unit 1200. Since the scan unit 1100 performs optical scanning, if an original document includes a halftone pattern, a scan image that is obtained also includes the halftone pattern of the original document as-is. In this regard, the halftone pattern refers to a pattern in which brightness and medium density are expressed by adjusting at least one of the number of dots or the thickness of dots when an image is expressed by using a plurality of dots.

The control unit 1200 controls an overall operation of configurations included in the image forming apparatus 1000, and more particularly, performs descreening work for removing a halftone pattern included in the scan image received from the scan unit 1100 and also performs halftoning on a scan image in which the halftone pattern has been removed according to a resolution of the image forming apparatus 1000. An output image obtained as a result is transmitted to the print unit 1300.

The descreening work may be described as follows. When an original document printed by a printer and including a halftone pattern is copied, a scan image obtained by optically scanning the original document includes the halftone pattern generated by the printer. Accordingly, if halftoning is performed on the obtained scan image according to a resolution of a photocopier, a final output document may have a moiré phenomenon due to halftoning frequency interference between the printer, which has printed the original document, and the photocopier. Work for removing a halftone pattern included in a scan image to prevent such a moiré phenomenon is referred to as descreening work.

Specifically describing a process of performing descreening work, the control unit 1200 removes a halftone pattern by dividing a region of a scan image through analysis of frequency characteristics of the scan image, estimating a resolution of the halftone pattern, and adaptively performing filtering according to regions resulting from dividing the region and the estimated resolution. A detailed description thereof is as follows.

The control unit 1200 divides a region of a scan image through analysis of frequency characteristics of the scan image. In detail, the control unit 1200 determines halftone characteristics of a corresponding pixel by analyzing frequency characteristics with respect to each pixel of the scan image, and determines a region including the corresponding pixel as one of an edge region, a texture region, and a flat region according to the determined halftone characteristics. That is, the control unit 1200 divides the scan image into an edge region, a texture region, and a flat region through frequency characteristic analysis.

The control unit 1200 may estimate a resolution of a halftone pattern through analysis of frequency characteristics of the scan image. In detail, the control unit 1200 may obtain a lines per inch (LPI) estimate and angle characteristics of the halftone pattern by detecting a peak value in frequency space and selecting a frequency band corresponding to the peak value, and in this regard, a Hadamard space may be used as the frequency space. That is, the control unit 1200 may transform the scan image into frequency characteristic values in the Hadamard space via Hadamard transformation and then may analyze frequency characteristics. The control unit 1200 may use the obtained LPI estimate and angle characteristics to perform filtering.

The control unit 1200 removes the halftone pattern by adaptively performing filtering according to characteristics of divided regions. In detail, the control unit 1200 performs filtering for removing the halftone pattern while protecting details of an edge and texture by using a filter that makes up for shortcomings of a sigma filter and a bilateral filter, with respect to the edge region and the texture region. On the other hand, the control unit 1200 adaptively performs filtering by reflecting a resolution estimate of the halftone pattern, that is, an LPI estimate, and angle characteristics of the halftone pattern, with respect to the flat region.

A halftone pattern included in a print document may have high frequency characteristics or low frequency characteristics according to a resolution of a printer that has performed printing and characteristics of halftoning performed during a printing process. However, when filtering is uniformly performed regardless of frequency characteristics of the halftone pattern, a moiré phenomenon may not be effectively removed with respect to the halftone pattern that has low frequency characteristics, and details may be excessively damaged with respect to the halftone pattern that has high frequency characteristics. Accordingly, the control unit 1200 of the image forming apparatus 1000 according to the present embodiment may analyze frequency characteristics of the halftone pattern and may adaptively perform filtering accordingly, thereby effectively removing the moiré phenomenon.

A method of performing descreening work via the control unit 1200 will be described in detail below by referring to a diagram that shows detailed configurations of the control unit 1200 and a detailed example.

If the control unit 1200 has removed a halftone pattern included in a scan image through descreening work, the control unit 1200 performs halftoning according to an output resolution of the print unit 1300 and then outputs image data to the print unit 1300.

The print unit 1300 outputs a copy document by printing the image data received from the control unit 1200. The output resolution that may be supported by the print unit 1300 is previously determined, and the control unit 1200 performs halftoning accordingly when the control unit 1200 generates a print image.

The user interface unit 1400 is a configuration for receiving a user's input for operation and management of the image forming apparatus 1000 and displaying an operational status, a work performance result, etc. of the image forming apparatus 1000, and may be a manipulation panel implemented as a touchscreen, etc.

The storage unit 1500 is a configuration for storing data required for a work process such as scanning or printing, and may include a hard disk drive (HDD), a random-access memory (RAM), etc.

Figure 2:
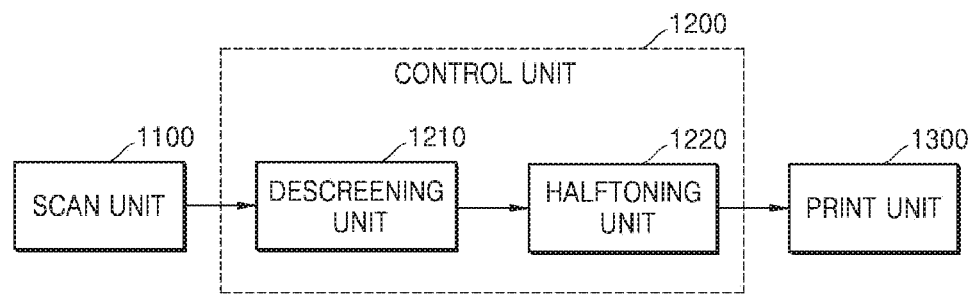
FIG. 2 shows a path through which image data is transmitted when an original document including a halftone pattern is copied, according to an embodiment.

FIG. 2 shows a path through which image data is transmitted when an original document including a halftone pattern is copied, according to an embodiment.

Referring to FIG. 2, the control unit 1200 includes a descreening unit 1210 and a halftoning unit 1220.

The scan unit 1100 transmits a scan image obtained by optically scanning an original document including a halftone pattern to the descreening unit 1210 of the control unit 1200.

The scan image received by the descreening unit 1210 includes the halftone pattern of the original document as-is. Accordingly, the descreening unit 1210 analyzes frequency characteristics of the received scan image, adaptively removes the halftone pattern included in the scan image according to the analyzed frequency characteristics, and then, transmits a scan image in which the halftone pattern has been removed to the halftoning unit 1220.

The halftoning unit 1220 performs halftoning on the received image and then transmits the image to the print unit 1300. In this regard, the halftoning unit 1220 performs halftoning according to a printing resolution that is supported by the print unit 1300.

The print unit 1300 prints the image received from the halftoning unit 1220.

Figure 3:
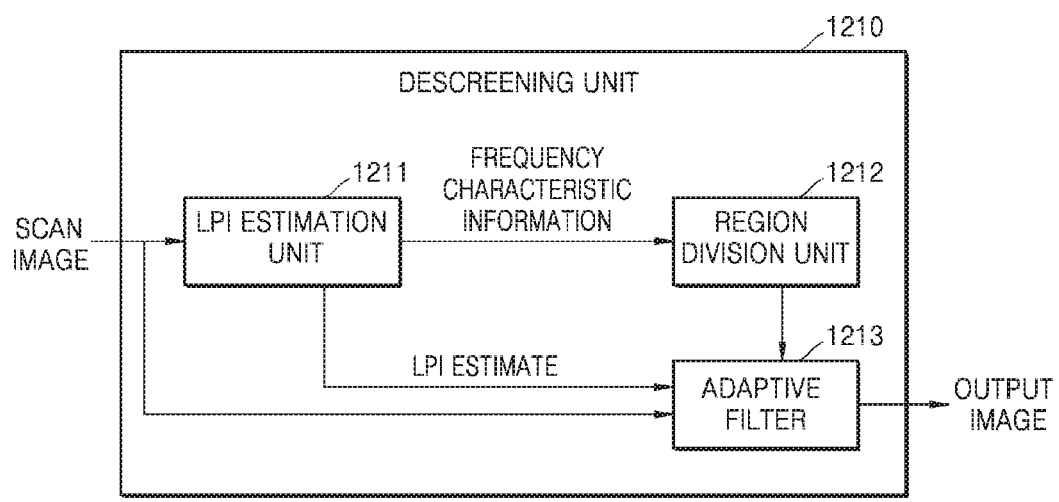
FIG. 3 shows detailed configurations of a descreening unit included in a control unit, according to an embodiment.

FIG. 3 shows detailed configurations of the descreening unit 1210 included in the control unit 1200, according to an embodiment.

Referring to FIG. 3, the descreening unit 1210 may include an LPI estimation unit 1211, a region division unit 1212, and an adaptive filter 1213.

The LPI estimation unit 1211 estimates LPI of a halftone pattern by analyzing frequency characteristics of a scan image, transmits frequency characteristic information obtained as a result to the region division unit 1212, and transmits an LPI estimate to the adaptive filter 1213. The LPI estimation unit 1211 uses Hadamard transformation to analyze frequency characteristics of the scan image, and estimates the LPI of the halftone pattern by selecting a peak value in a Hadamard space and obtains angle characteristics. A detailed process of estimating the LPI through frequency characteristic analysis via the LPI estimation unit 1211 will be described in detail below.

The region division unit 1212 divides a region of the scan image by using the frequency characteristic information received from the LPI estimation unit 1211. That is, the region division unit 1212 divides the scan image into an edge region, a texture region, and a flat region according to characteristics of a halftone pattern included in the scan image. The region division unit 1212 transmits information regarding divided regions to the adaptive filter 1213. A detailed method of dividing a region according to frequency characteristics via the region division unit 1212 will be described below in an embodiment.

The adaptive filter 1213 removes the halftone pattern by adaptively performing filtering on the scan image, based on the region division information received from the region division unit 1212 and the LPI estimate received from the LPI estimation unit 1211. A detailed method of adaptively performing filtering based on region division information and an LPI estimate via the adaptive filter 1213 will be described below in an embodiment.

Figure 4:
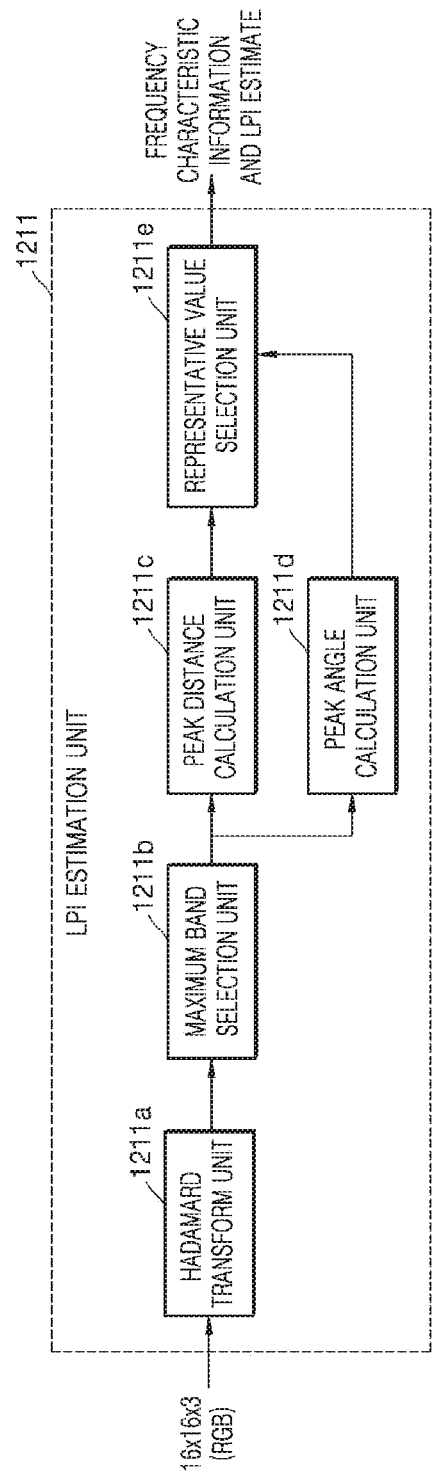
FIG. 4 shows detailed configurations of a lines per inch (LPI) estimation unit according to an embodiment.

FIG. 4 shows detailed configurations of the LPI estimation unit 1211 according to an embodiment. First, operations of detailed configurations of the LPI estimation unit 1211 will be briefly described with reference to FIG. 4, and a concrete method in which detailed configurations of the LPI estimation unit 1211 operate will be described below with reference to example drawings.

Referring to FIG. 4, the LPI estimation unit 1211 according to the present embodiment may include a Hadamard transform unit 1211a, a maximum band selection unit 1211b, a peak distance calculation unit 1211c, a peak angle calculation unit 1211d, and a representative value selection unit 1211e.

The Hadamard transform unit 1211a performs Hadamard transformation based on a certain unit of pixels on a scan image and thus represents the scan image as frequency characteristic values in a Hadamard space. Referring to FIG. 4, Hadamard transformation may be performed based on a 16×16 pixel unit with respect to each of three RGB channels.

The maximum band selection unit 1211b detects a peak value from among frequency characteristic values in the Hadamard space, and selects a frequency band corresponding to the detected peak value. The maximum band selection unit 1211b transmits information regarding the detected peak value and the frequency band corresponding to the peak value to the peak distance calculation unit 1211c and the peak angle calculation unit 1211d.

When the maximum band selection unit 1211b detects a peak value, the maximum band selection unit 1211b may divide the Hadamard space into two regions (a first region and a second region), may detect a peak value with respect to each region, and may select a frequency band corresponding to the detected peak value.

The peak distance calculation unit 1211c calculates a distance between a peak point and a reference point in the Hadamard space by using the received information regarding the frequency band corresponding to the peak value, and estimates an LPI value by using the calculated distance.

The peak angle calculation unit 1211d calculates an angle regarding a location of the peak point in the Hadamard space by using the received information regarding the frequency band corresponding to the peak value.

The peak distance calculation unit 1211c and the peak angle calculation unit 1211d may also calculate a peak distance and a peak angle with respect to each of the two divided regions (the first region and the second region).

The representative value selection unit 1211e selects a representative value representing the three RGB channels from among frequency characteristic information and an LPI estimate obtained with respect to each of the three channels and outputs the representative value.

Hereinafter, a process of dividing a region through analysis of frequency characteristics of a scan image, obtaining an LPI estimate and angle characteristics of a halftone pattern, and then performing adaptive filtering will be described in detail with reference to FIGS. 5 to 10. In this regard, the process will be described with reference to FIGS. 1 to 4, too.

FIG. 5 shows a 16×16 Hadamard matrix for performing Hadamard transformation on a scan image in a frequency adaptive descreening method according to an embodiment.

In the present embodiment, Hadamard transformation appropriate for analysis of characteristics of a halftone image is performed. Brightness distribution of halftone is mainly concentrated at 0 or 255, and halftone is composed of components that change significantly. Therefore, when discrete cosine transformation (DCT) or discrete Fourier transformation (DFT), which is used in compression of a soft nature image or image analysis, is used, a wrong analysis result may be obtained, and more particularly, the DCT or DFT is not appropriate for analysis of a local image. The reason for this is that, in the DCT or DFT, a basic signal has continuous characteristics. Accordingly, in the present embodiment, Hadamard transformation, in which a basic signal has discrete characteristics, is used. Compared to the DCT or DFT, the Hadamard transformation has high analysis performance in a halftone image, or may be implemented simply by addition and subtraction without a multiplying operation and thus has an advantage in terms of high-speed implementation or HW design.

Coefficients included in a Hadamard matrix are represented by Equation 1 below.

$$H(u,v) \qquad [\text{Equation 1}]$$

In this regard, each of u and v is a coordinate value of a pixel when taking a top left corner of the matrix as a reference point. For example, in the Hadamard matrix of FIG. 5, H(1,1) is 1 because H(1,1) is a coefficient value of a pixel located at the top left corner, and H(16,1) is 1 because H(16,1) is a coefficient value of a pixel located at a top right corner. Also, H(1,16), which is a coefficient value of a pixel located at a bottom left corner, is 1, and H(16,16), which is a coefficient value of a pixel located at a bottom right corner, is −1.

An equation for performing Hadamard transformation by using the Hadamard matrix is shown as Equation 2 below.

$$F(u, v) = \sum_{j=1}^{16}\left(\sum_{i=1}^{16} I(i, j) \cdot H(u, i)\right) \cdot H(j, v)$$ [Equation 2]

In this regard, I(i,j) corresponds to brightness of an image of each of 16×16 pixels of a scan image, and each of i and j is a coordinate value of a pixel when taking a top left corner of the 16×16 pixels as a reference point.

Figure 6:
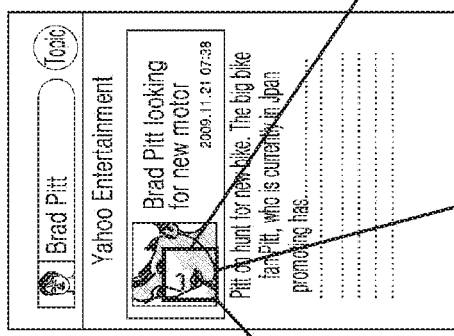
FIG. 6 shows a result obtained by performing Hadamard transformation based on a 16×16 pixel unit with respect to each of RGB channels according to an embodiment.

FIG. 6 shows a result obtained by performing Hadamard transformation based on a 16×16 pixel unit with respect to each of RGB channels according to an embodiment. When a scan image is a color image, the Hadamard transform unit 1211a of the LPI estimation unit 1211 performs Hadamard transformation based on a 16×16 pixel unit according to Equation 2 with respect to each of RGB channels. The Hadamard transform unit 1211a transmits transformed frequency characteristic values in a Hadamard space to the maximum band selection unit 1211b.

Hereinafter, a detailed method of analyzing frequency characteristics in a Hadamard space for each channel and estimating an LPI value via the LPI estimation unit 1211 will be described with reference to FIGS. 7 to 9.

Figure 7:
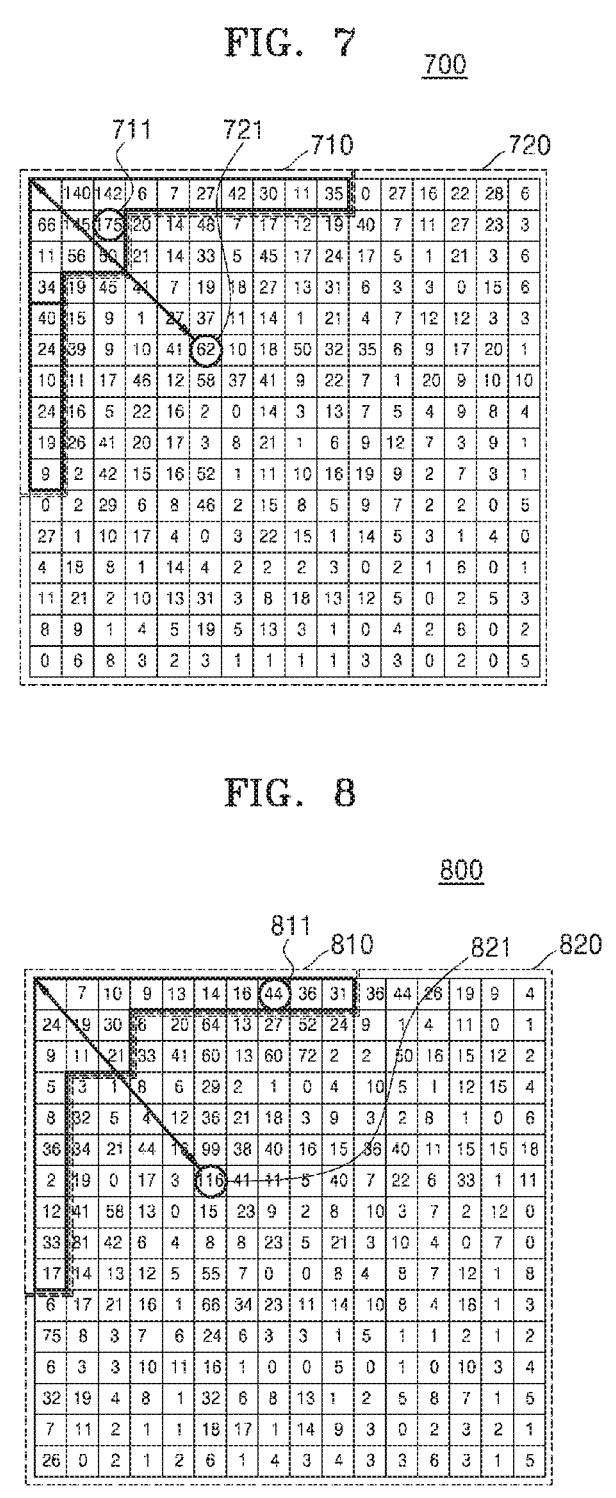

FIGS. 7 to 9 show frequency characteristic values in a Hadamard space for each of RGB channels.

First, referring to FIG. 7 corresponding to a Red channel, the maximum band selection unit 1211b of the LPI estimation unit 1211 divides a Hadamard space 700 into two regions, that is, a first region 710 and a second region 720. In this regard, a criterion for dividing a region is for making a division between a halftone region having edge characteristics and the other region and may be properly set as needed. In FIG. 7, the first region 710 is set so as to include top left 3×3 pixels corresponding to a low frequency region having characteristics of an edge component and 10×1 pixels and 1×10 pixels only having vertical and horizontal components respectively, and the other portion is set as the second region 720.

When the maximum band selection unit 1211b has divided a Hadamard space into two regions, the maximum band selection unit 1211b detects a peak value with respect to each region according to Equations 3 to 6 below and selects a frequency band corresponding to the detected peak value.

$$(i,j) = \arg\max |F(u,v)|, (u,v) \in B$$ [Equation 3]

$$(i_2,j_2) = \arg\max |F(u,v)|, (u,v) \notin B$$ [Equation 4]

$$P_{edge} = F(i,j)$$ [Equation 5]

$$P_{flat} = F(i_2,j_2)$$ [Equation 6]

In this regard, F(u,v) denotes a frequency characteristic value of a pixel corresponding to a coordinate of u and v, and B refers to the first region 710.

Accordingly, according to Equation 3, (i,j) refers to a coordinate of a frequency band corresponding to a frequency characteristic value that is maximum within the first region 710, and according to Equation 5, $P_{edge}$ refers to the frequency characteristic value that is maximum within the first region 710, that is, a peak value. Referring to FIG. 7, since the peak value is 175 within the first region 710, $P_{edge}$ is 175, and (i,j), which is a coordinate of a frequency band corresponding to the peak value, is (3,2).

According to Equation 4, $(i_2,j_2)$ refers to a coordinate of a frequency band corresponding to a frequency characteristic value that is maximum within the second region 720, and according to Equation 6, $P_{flat}$ refers to the frequency characteristic value that is maximum within the second region 720, that is, a peak value. Referring to FIG. 7, since the peak value is 62 within the second region 720, $P_{flat}$ is 62, and $(i_2,j_2)$, which is a coordinate of a frequency band corresponding to the peak value, is (6,6).

When the maximum band selection unit 1211b has selected a peak value and a frequency band corresponding to the peak value, the maximum band selection unit 1211b transmits information regarding the peak value and the frequency band to the peak distance calculation unit 1211c and the peak angle calculation unit 1211d. The peak distance calculation unit 1211c calculates a distance between a peak point and a reference point in the Hadamard space and estimates an LPI value by using the distance. Also, the peak angle calculation unit 1211d calculates an angle corresponding to a location of the peak point in the Hadamard space. Equations 7 to 10 are shown below for reference.

$$LPI_{edge} = \alpha \cdot \sqrt{i^2 + j^2}$$ [Equation 7]

$$LPI_{flat} = \alpha \cdot \sqrt{i_2^2 + j_2^2}$$ [Equation 8]

$$Angle_{edge} = \arctan(i/j)$$ [Equation 9]

$$Angle_{flat} = \arctan(i_2/j_2)$$ [Equation 10]

Equations 7 and 8 are for estimating LPI values in the first region 710 and the second region 720, respectively, and in this regard, α corresponds to a correction coefficient for LPI value estimation. The correction coefficient α has something to do with resolving power (DPI) of the scan unit 1100 and Hadamard frequency resolution $r_f$ and is determined by Equation 11 below.

$$\alpha = \frac{r_f}{2 \cdot \sqrt{r_x^2 + r_y^2}}$$ [Equation 11]

In this regard, $r_x$ and $r_y$ respectively refer to values of the number of pixels of each side in the Hadamard space. For example, when 16×16 Hadamard transformation is used, the correction coefficient α at 600 DPI is $$\alpha = \frac{600}{2 \cdot \sqrt{16^2 + 16^2}} = 13.25.$$

As calculated above, (i,j) and $(i_2,j_2)$ regarding the Red channel are (3,2) and (6,6), and accordingly, the peak distance calculation unit 1211c calculates an LPI estimate regarding each of the first region 710 and the second region 720 by putting (3,2) and (6,6) in Equations 7 and 8. Also, the peak angle calculation unit 1211d calculates an angle by putting (i,j) and $(i_2,j_2)$ regarding the Red channel in Equations 9 and 10. The LPI estimate and the angle calculated as such are used to perform adaptive filtering afterwards.

Next, referring to FIG. 8 corresponding to a Green channel, the maximum band selection unit 1211b of the LPI estimation unit 1211 divides a Hadamard space 800 into two regions, that is, a first region 810 and a second region 820. In this regard, a criterion for dividing a region is the same as described above with reference to FIG. 7.

When the maximum band selection unit 1211b has divided a Hadamard space into two regions, the maximum band selection unit 1211b detects a peak value with respect to each region according to Equations 3 to 6 above and selects a frequency band corresponding to the detected peak value.

Referring to FIG. 8, since a peak value in the first region 810 is 44, $P_{edge}$ is 44, and (i,j), which is a coordinate of a frequency band corresponding to the peak value, is (8,1). Also, since a peak value in the second region 820 is 116, $P_{flat}$ is 116, and $(i_2,j_2)$, which is a coordinate of a frequency band corresponding to the peak value, is (6,7).

When the maximum band selection unit 1211b has selected a peak value and a frequency band corresponding to the peak value, the maximum band selection unit 1211b transmits information regarding the peak value and the frequency band to the peak distance calculation unit 1211c and the peak angle calculation unit 1211d. As described above with reference to FIG. 7, the peak distance calculation unit 1211c and the peak angle calculation unit 1211d respectively calculate an LPI estimate and an angle corresponding to a location of a peak point by using Equations 7 to 10.

As calculated above, (i,j) and $(i_2,j_2)$ regarding the Green channel are (8,1) and (6,7), and accordingly, the peak distance calculation unit 1211c calculates an LPI estimate regarding each of the first region 810 and the second region 820 by putting (8,1) and (6,7) in Equations 7 and 8. Also, the peak angle calculation unit 1211d calculates an angle by putting (i,j) and $(i_2,j_2)$ regarding the Green channel in Equations 9 and 10. The LPI estimate and the angle calculated as such are used to perform adaptive filtering afterwards.

Next, referring to FIG. 9 corresponding to a Blue channel, the maximum band selection unit 1211b of the LPI estimation unit 1211 divides a Hadamard space 900 into two regions, that is, a first region 910 and a second region 920. In this regard, a criterion for dividing a region is the same as described above with reference to FIG. 7.

When the maximum band selection unit 1211b has divided a Hadamard space into two regions, the maximum band selection unit 1211b detects a peak value from among frequency characteristic values of pixels included in each region according to Equations 3 to 6 above, and selects a frequency band corresponding to the detected peak value. In this regard, the frequency band corresponding to the detected peak value refers to a coordinate of a pixel where the peak value has been detected in the Hadamard space.

Referring to FIG. 9, since a peak value in the first region 910 is 349, $P_{edge}$ is 349, and (i,j), which is a coordinate of a frequency band corresponding to the peak value, is (2,1). Also, since a peak value in the second region 920 is 73, $P_{flat}$ is 73, and $(i_2,j_2)$, which is a coordinate of a frequency band corresponding to the peak value, is (7,3).

When the maximum band selection unit 1211b has selected a peak value and a frequency band corresponding to the peak value, the maximum band selection unit 1211b transmits information regarding the peak value and the frequency band to the peak distance calculation unit 1211c and the peak angle calculation unit 1211d. As described above with reference to FIG. 7, the peak distance calculation unit 1211c and the peak angle calculation unit 1211d respectively calculate an LPI estimate and an angle corresponding to a location of a peak point by using Equations 7 to 10.

As calculated above, (i,j) and $(i_2,j_2)$ regarding the Blue channel are (2,1) and (7,3), and accordingly, the peak distance calculation unit 1211c calculates an LPI estimate regarding each of the first region 910 and the second region 920 by putting (2,1) and (7,3) in Equations 7 and 8. Also, the peak angle calculation unit 1211d calculates an angle by putting (i,j) and $(i_2,j_2)$ regarding the Blue channel in Equations 9 and 10. The LPI estimate and the angle calculated as such are used to perform adaptive filtering afterwards.

The representative value selection unit 1211e selects a representative value representing the three RGB channels from among frequency characteristic information and an LPI estimate obtained with respect to each of the three channels and outputs the representative value. The representative value selection unit 1211e selects the representative value according to Equations 12 and 13 below.

$$(i,j,\text{color}) = \arg\text{Min}(|F_R(i_R,j_R)|, |F_G(i_G,j_G)|, |F_B(i_B,j_B)|),$$
$$(i,j) \in B \quad \text{[Equation 12]}$$

$$(i_2,j_2,\text{color}) = \arg\text{Min}(|F_R(i_R,j_R)|, |F_G(i_G,j_G)|, |F_B(i_B,j_B)|), (i_2,j_2) \notin B \quad \text{[Equation 13]}$$

According to the example described above with reference to FIGS. 7 to 9, since a peak value in a first region is minimum in the Green channel, (i,j,color), which is a representative value regarding the first region, is (8,1,green), and $P_{edge}$ is 44. Also, since a peak value in a second region is minimum in the Red channel, $(i_2,j_2,\text{color})$, which is a representative value regarding the second region, is (6,6,red), and $P_{flat}$ is 62.

The representative value selection unit 1211e may select and output a representative value of each of an LPI estimate and an angle. That is, the representative value selection unit 1211e may obtain representative values regarding the LPI estimate and the angle by putting (i,j)=(8,1) and $(i_2,j_2)$=(6,6) into Equations 7 to 10 above.

As described above, when the LPI estimation unit 1211 has obtained representative values regarding a peak value ($P_{edge}$, $P_{flat}$), an LPI estimate ($LPI_{edge}$, $LPI_{flat}$), and an angle ($Angle_{edge}$, $Angle_{flat}$) in each region of a Hadamard space, the LPI estimation unit 1211 transmits a peak value from among them to the region division unit 1212 as frequency characteristic information, and transmits an LPI estimate and an angle to the adaptive filter 1213.

The region division unit 1212 determines characteristics of a halftone pattern by comparing sizes of received peak values regarding respective regions as shown in Equations 14 and 15 below.

$$\text{Edge}: P_{edge} > P_{flat} \quad \text{[Equation 14]}$$

$$\text{Flat}: P_{edge} < P_{flat} \quad \text{[Equation 15]}$$

That is, when $P_{edge}$ is greater than $P_{flat}$, the region division unit 1212 determines characteristics of the halftone pattern as edge. On the other hand, when $P_{flat}$ is greater than $P_{edge}$, the region division unit 1212 determines characteristics of the halftone pattern as flat. Also, when characteristics of the halftone pattern is determined as flat by Equation 15, the region division unit 1212 determines once again whether characteristics of the halftone pattern correspond to texture by using Equations 16 to 18 below.

$$LPI_{mean} = \frac{\sum_{i=1}^{N} LPI_i}{N} \quad \text{[Equation 16]}$$

$$LPI_{var} = \frac{\sum_{i=1}^{N} |LPI_i - LPI_{mean}|}{N} \quad \text{[Equation 17]}$$

Texture: Flat $\cap$ $(LPI_{mean} > TH_{mean}) \cap (LPI_{var} > TH_{var})$ [Equation 18]

In this regard, $TH_{mean}$ and $TH_{var}$ respectively correspond to a mean and a variance of critical values for determination of a texture region.

Characteristics of the halftone pattern determined based on a pixel unit may be compared by including a surrounding region, in order to reduce an error. For example, determination may be made by comparing frequencies of a pixel determined as edge or flat in a 5×5 region around a central pixel.

As described above, the region division unit 1212 may determine characteristics of the halftone pattern regarding each pixel as one of edge, texture, and flat, and may divide the entire scan image into an edge region, a texture region, and a flat region according to the determined characteristics. The region division unit 1212 transmits region division information to the adaptive filter 1213.

The adaptive filter 1213 adaptively performs filtering based on the received region division information, LPI estimate, and angle. In detail, the adaptive filter 1213 adaptively performs filtering according to characteristics of regions, and performs filtering differently with respect to a case of an edge region or a texture region and a case of a flat region.

First, in the case of an edge region or a texture region, the adaptive filter 1213 performs filtering for removing the halftone pattern while protecting details of an edge and texture by using a filter that makes up for shortcomings of a sigma filter and a bilateral filter.

The existing sigma filter protects an outline and removes noise by obtaining a weighting through processing based on a pixel unit and performing filtering. However, in halftone, an image unit is clustered dots, and accordingly, a pattern of halftone is hardly removed by the existing sigma filter. To improve such a problem, a 3×3 block is set as a basic unit of filtering so that an outline may be protected while halftone is removed. In this case, the filter is represented by Equations 19 and 20 below.

$$blk_{sigma} = \frac{\sum_{i=0}^{8} w \cdot blk_i}{\sum w} \quad \text{[Equation 19]}$$

$w = 1$ if $|blk_i - blk_4| \le$ sigma, [Equation 20]
$|blk_{dir,i} - blk_{dir,4}| \le$ sigma$_{dir}$
$w = 0$ else In this regard, $blk_i$ denotes an average brightness of an $i^{th}$ block, and $blk_{dir,\ i}$ denotes an average brightness of a direction corresponding to the $i^{th}$ block.

In the case of a flat region, the adaptive filter 1213 performs low frequency filtering on a scan image according to Equation 21 below by using the LPI estimate and the angle.

$Y' = Y*G$ [Equation 21]

In this regard, G is a two-dimensional Gaussian filter, and a coefficient of the Gaussian filter is adaptively determined according to the LPI estimate and the angle. An equation of acquiring the coefficient of the Gaussian filter is shown as Equations 22 to 24 below.

$$f(x, y) = \exp\left(-\left(\frac{x^2}{2\sigma_x^2} + \frac{y^2}{2\sigma_y^2}\right)\right) \quad \text{[Equation 22]}$$

$$\sigma_x^2 = a \cdot \frac{\cos(\text{Angle})}{LPI} \quad \text{[Equation 23]}$$

$$\sigma_y^2 = b \cdot \frac{\sin(\text{Angle})}{LPI} \quad \text{[Equation 24]}$$

That is, the adaptive filter 1213 acquires coefficients of the two-dimensional Gaussian filter by putting the LPI estimate and the angle received from the LPI estimation unit 1211 in Equations 22 to 24 above, and performs filtering by using the Gaussian filter obtained as such.

In adaptive filtering described above, as the LPI estimate decreases, values of $\sigma_x$ and $\sigma_y$ increase. Accordingly, a size of the filter increases, and thus, performance in removing the halftone pattern that has low frequency characteristics improves. In addition, due to an adaptive operation with respect to the angle, excellent performance in removing halftone characteristics having various angle characteristics may also be expected.

As described above in the example, adaptive filtering through analysis of frequency characteristics is performed based on a 16×16 pixel unit, and is performed on the entire scan image while involving movement of pixel by pixel. FIG. 10 shows movement of a pixel unit for performing frequency adaptive descreening according to an embodiment. Referring to FIG. 10, a window of the 16×16 pixel unit may be moved right pixel by pixel.

Hereinafter, a filtering method according to another embodiment will be described.

Figure 16:
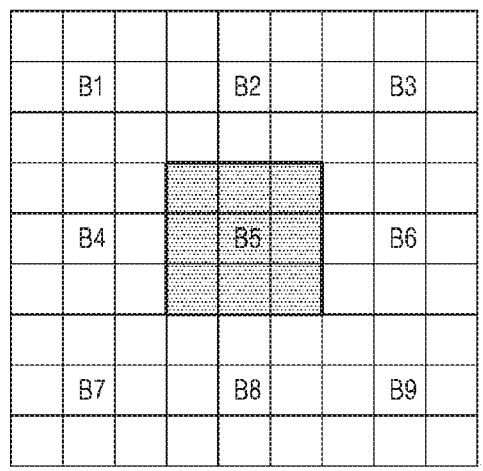
FIG. 16 shows sub-blocks that are used in adaptive filtering, according to an embodiment.

In the following embodiment, a size of a block to which the adaptive filter 1213 is applied is changed according to an LPI estimate. As the LPI estimate decreases, the size of a block increases, and a threshold value of a filter is determined by a peak power value. In particular, the filter used in the following embodiment uses 9 sub-blocks B1 to B9 as shown in FIG. 16. That is, the filter is applied based on sub-blocks. In this regard, a size of each sub-block is changed according to the LPI estimate.

First, in a case of an edge or texture region having a high LPI estimate, the adaptive filter 1213 performs filtering on the region by using a pixel precision filter defined by Equation 25 below, and thus, removes a halftone pattern while protecting details of an edge.

$$\text{Pixel}_{sigma} = \frac{\sum_{i=0}^{8}\sum_{j=0}^{8} w_{ij} \cdot Y_{ij}}{\sum w_{i,j}} \quad \text{[Equation 25]}$$

$w_{k,l} = 1$ if $|Y'_{i,j} - Y'_{i+k,j+l}| \le$ sigma
$w_{k,l} = 0$ else

In this regard, Y is an original scan image including halftone characteristics. That is, $Y_{i,j}$ is a pixel value corresponding to a coordinate value (i,j) on the original scan image. Y' is a scan image with a Gaussian filter applied. In this regard, a sigma value of the Gaussian filter is determined by the LPI estimate value, and a detailed method of acquiring a coefficient of the Gaussian filter is the same as described above with reference to Equations 22 to 24.

In a case of a flat region having a low LPI estimate, the adaptive filter 1213 performs filtering on the region by using a block-based sigma filter defined by Equation 26 below.

$$Blk_{sigma} = \frac{\sum_{i=0}^{8} w_i \cdot blk_i}{\sum w_i} \qquad \text{[Equation 26]}$$

$w_k = 1$ if $|blk_k - blk_4| \leq$ sigma
$w_k = 0$ else

In this regard, $blk_i$ denotes an average brightness of an $i^{th}$ sub-block, a value of sigma is determined by peak power. Also, a size of each sub-block is determined by Equation 27 below. That is, when a value of $Sub\_Blk_{size}$ is N, a size of a sub-block corresponds to N×N pixels.

$$Sub\_Blk_{size} = \frac{1.5 \cdot DPI}{LPI \cdot 2} \qquad \text{[Equation 27]}$$

Figure 11:
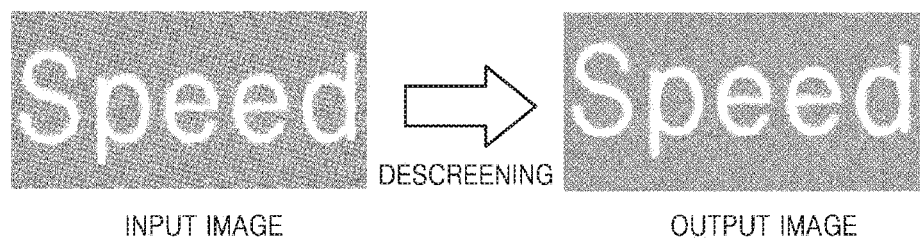
FIG. 11 shows an image before and after performing frequency adaptive descreening, according to an embodiment.

FIG. 11 shows an image before and after performing frequency adaptive descreening according to an embodiment.

Referring to FIG. 11, a left input image includes a halftone pattern, whereas a right output image, which is an image after performing descreening, hardly has the halftone pattern. It may also be learned that, as a result of adaptively performing descreening through analysis of frequency characteristics, only the halftone pattern is effectively removed while details of an edge portion of text is protected.

FIGS. 12 to 15 are flowcharts of a frequency adaptive descreening method according to embodiments.

Hereinafter, operations of a frequency adaptive descreening method according to embodiments will be described in detail with reference to FIGS. 1 to 4 together with FIGS. 12 to 15. Even if there is no specific mention, the above detailed descriptions may be applied the same to the method of FIGS. 12 to 15.

Figure 12:
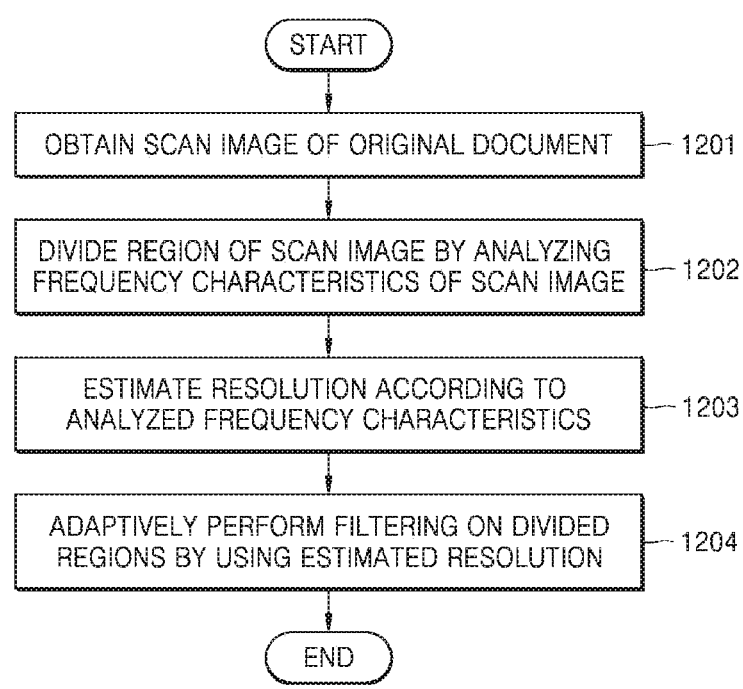
FIGS. 12 to 15 are flowcharts of a frequency adaptive descreening method according to embodiments.

Referring to FIG. 12, in operation 1201, the descreening unit 1210 of the control unit 1200 obtains a scan image of an original document from the scan unit 1100. In operation 1202, the LPI estimation unit 1211 estimates resolution by analyzing frequency characteristics of the obtained scan image. In operation 1203, the region division unit 1212 divides a region of the scan image according to halftone characteristics by referring to the analyzed frequency characteristics. In operation 1204, the adaptive filter 1213 adaptively performs filtering on divided regions by using the estimated resolution.

Figure 13:
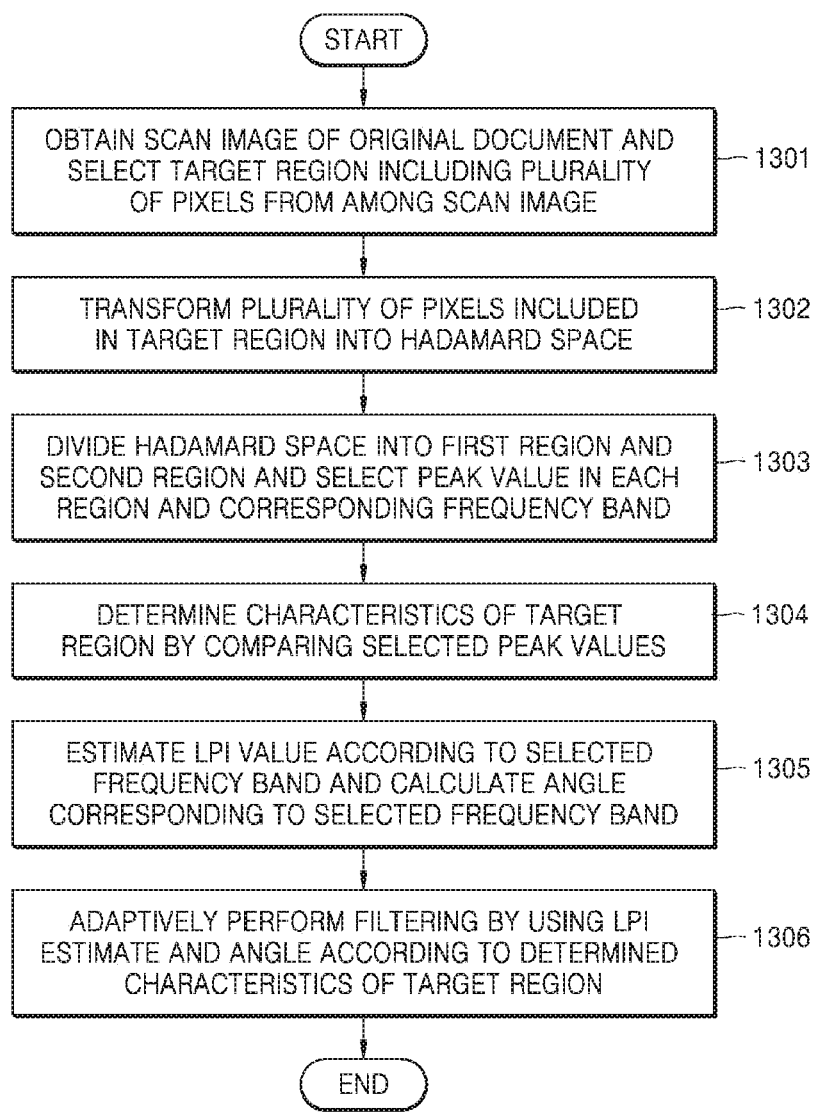

FIG. 13 is a detailed flowchart of the operations of FIG. 12.

Referring to FIG. 13, in operation 1301, the descreening unit 1210 of the control unit 1200 obtains a scan image of an original document from the scan unit 1100, and selects a target region including a plurality of pixels from among the scan image.

In operation 1302, the LPI estimation unit 1211 transforms the plurality of pixels included in the target region into a Hadamard space.

In operation 1303, the LPI estimation unit 1211 divides the Hadamard space into a first region and a second region, and selects a peak value from among frequency characteristic values of pixels included in each region and a frequency band corresponding to the peak value. In this regard, the frequency band corresponding to the peak value refers to a coordinate of a pixel where the peak value has been detected in the Hadamard space.

In operation 1304, the region division unit 1212 determines characteristics of the target region by comparing peak values respectively selected in the first region and the second region.

In operation 1305, the LPI estimation unit 1211 estimates an LPI value according to the selected frequency band and calculates an angle corresponding to the selected frequency band.

In operation 1306, the adaptive filter 1213 adaptively performs filtering by using the LPI estimate and the angle according to the determined characteristics of the target region.

Figure 14:
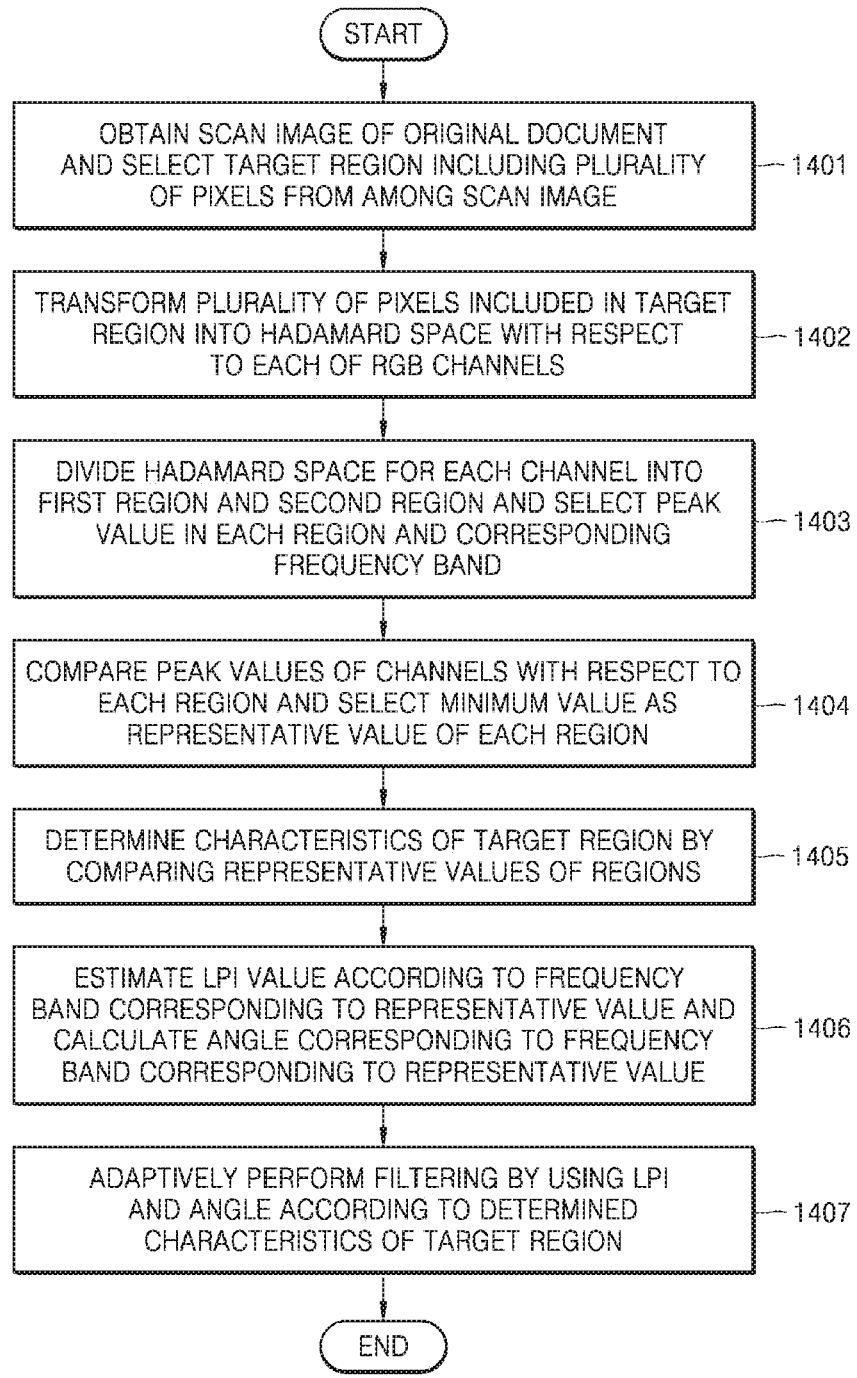

FIG. 14 is a flowchart of a process of analyzing frequency characteristics with respect to each of three RGB channels and selecting a representative value when an original document has color.

Referring to FIG. 14, in operation 1401, the descreening unit 1210 of the control unit 1200 obtains a scan image of an original document from the scan unit 1100, and selects a target region including a plurality of pixels from among the scan image.

In operation 1402, the LPI estimation unit 1211 transforms, with respect to each of RGB channels, the plurality of pixels included in the target region into a Hadamard space.

In operation 1403, the LPI estimation unit 1211 divides the Hadamard space for each channel into a first region and a second region, and selects a peak value from among frequency characteristic values of pixels included in each region and a frequency band corresponding to the peak value. In this regard, the frequency band corresponding to the peak value refers to a coordinate of a pixel where the peak value has been detected in the Hadamard space.

In operation 1404, the representative value selection unit 1211e of the LPI estimation unit 1211 compares peak values of the channels with respect to the first region and the second region, and selects a minimum value from among the peak values as a representative value of each region.

In operation 1405, the region division unit 1212 determines characteristics of the target region by comparing representative values of the regions.

In operation 1406, the LPI estimation unit 1211 estimates an LPI value according to a frequency band corresponding to the representative value, and calculates an angle corresponding to the frequency band corresponding to the representative value.

In operation 1407, the adaptive filter 1213 adaptively performs filtering by using the LPI estimate and the angle according to the determined characteristics of the target region.

Figure 15:
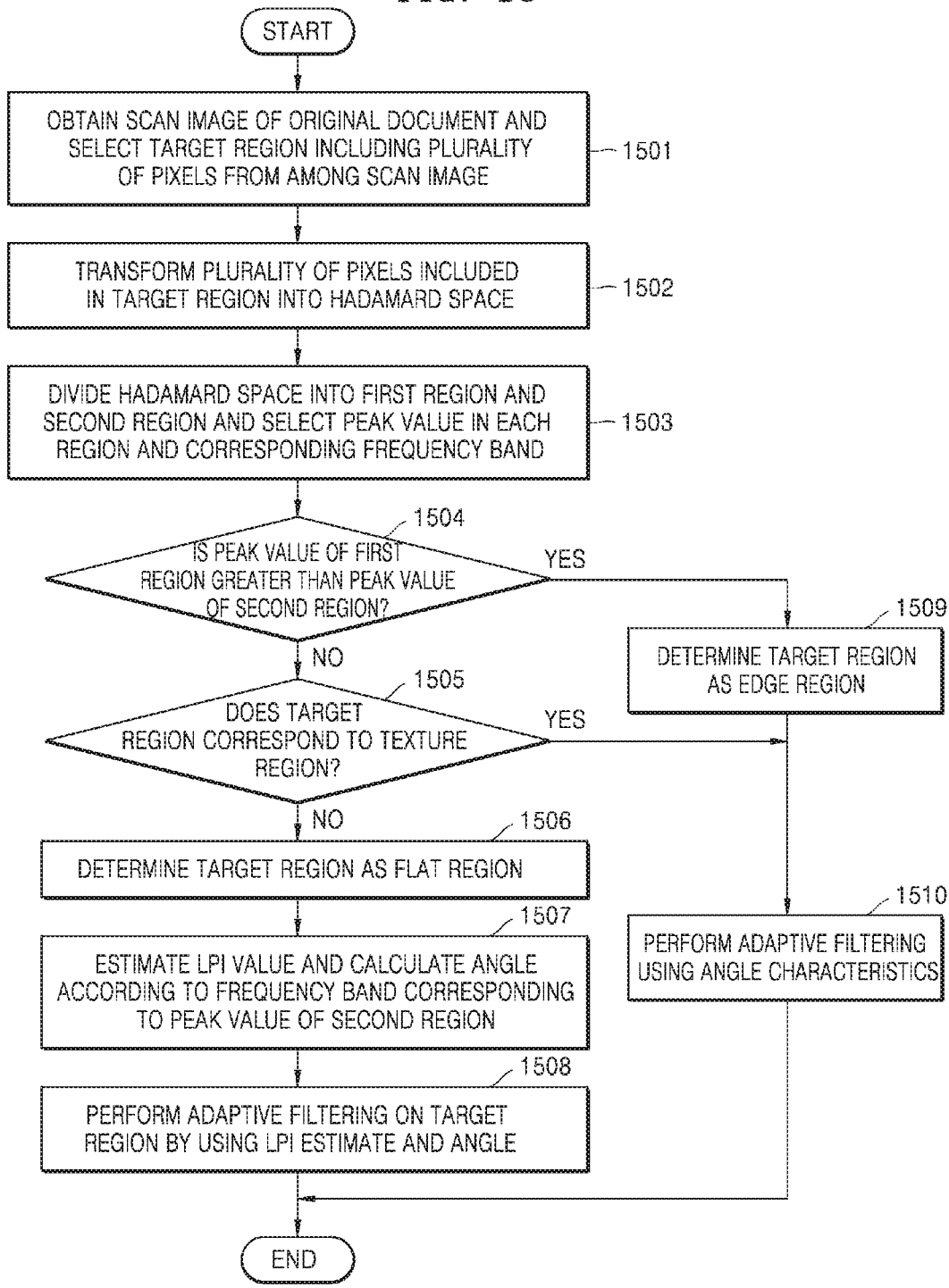

Referring to FIG. 15, in operation 1501, the descreening unit 1210 of the control unit 1200 obtains a scan image of an original document from the scan unit 1100, and selects a target region including a plurality of pixels from among the scan image.

In operation 1502, the LPI estimation unit 1211 transforms the plurality of pixels included in the target region into a Hadamard space.

In operation 1503, the LPI estimation unit 1211 divides the Hadamard space into a first region and a second region, and selects a peak value from among frequency characteristic values of pixels included in each region and a frequency band corresponding to the peak value. In this regard, the frequency band corresponding to the peak value refers to a coordinate of a pixel where the peak value has been detected in the Hadamard space.

In operation 1504, the region division unit 1212 determines whether a peak value of the first region is greater than a peak value of the second region. When it is determined that the peak value of the first region is greater than the peak value of the second region, the process moves on to operation 1509, and thus, the target region is determined as an edge region. Otherwise, the process moves on to operation 1505.

In operation 1505, the region division unit 1212 determines whether the target region corresponds to a texture region. When it is determined that the target region corresponds to the texture region, the process moves on to operation 1510, and thus, adaptive filtering using angle characteristics is performed. When the target region does not correspond to the texture region, the process moves on to operation 1506.

In operation 1506, the region division unit 1212 determines the target region as a flat region.

In operation 1507, the LPI estimation unit 1211 estimates an LPI value according to a frequency band corresponding to the peak value of the second region, and calculates an angle.

In operation 1508, the adaptive filter 1213 performs adaptive filtering on the target region by using the LPI estimate and the angle.

While this invention has been particularly shown and described with reference to exemplary embodiments thereof, it will be understood by those skilled in the art that various changes in form and details may be made therein without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

The embodiments of the present invention can be written as computer programs and can be implemented in general-use digital computers that execute the programs by using a non-transitory computer readable recording medium. Examples of the non-transitory computer readable recording medium include magnetic storage media (e.g., ROM, floppy disks, hard disks, etc.), optical recording media (e.g., CD-ROMs, or DVDs), etc.

The invention claimed is:

1. A frequency adaptive descreening method comprising:
obtaining a scan image of an original document;
dividing the scan image into a plurality of regions;
transforming pixels in a region among the plurality of regions into frequency characteristic values in a Hadamard space and dividing the Hadamard space into a first region and a second region;
selecting a first peak value and a second peak value from among the frequency characteristic values in the first region and the second region respectively;
determining frequency characteristics of the region by comparing the first peak value and the second peak value;
estimating a lines per inch (LPI) value of a halftone pattern with respect to the region by using a distance between a peak point and a reference point in the Hadamard space;
calculating an angle corresponding to the peak point in the Hadamard space; and
adaptively performing filtering on the region by using the estimated LPI value and the calculated angle.

2. The frequency adaptive descreening method of claim 1, wherein performing the filtering comprises:
performing filtering according to the frequency characteristics of the region by using a Gaussian filter that is determined according to the estimated LPI value and the calculated angle and a filter that is applied based on a plurality of sub-blocks having a size changed according to the estimated LPI value.

3. The frequency adaptive descreening method of claim 1, wherein estimating the LPI value comprises:
estimating the LPI value by using a coordinate of the frequency band corresponding to the selected first peak value and the selected second peak value in the Hadamard space and the number of pixels of each side of the Hadamard space.

4. The frequency adaptive descreening method of claim 1, wherein adaptively performing the filtering comprises:
performing filtering by using a Gaussian filter having a coefficient that is determined according to the estimated LPI value and the calculated angle, according to the determined frequency characteristics of the region.

5. A non-transitory computer-readable recording medium having recorded thereon a program for executing, on a computer, the method of claim 1.

6. An image forming apparatus comprising:
a scan unit for obtaining a scan image by scanning a document;
a control unit for processing the scan image and transmitting the scan image to a print unit to request printing; and
the print unit for printing the scan image processed by the control unit,
wherein the control unit is configured to perform descreening on the scan image according to frequency characteristics of the scan image, perform, according to a resolution supported by the print unit, halftoning on the scan image on which the descreening has been performed, and then, transmit the scan image to the print unit, and
wherein the control unit is further configured to perform the descreening by dividing the scan image into a plurality of regions, transforming pixels in a region among the plurality of regions into frequency characteristic values in a Hadamard space and dividing the Hadamard space into a first region and a second region, selecting a first peak value and a second peak value from among the frequency characteristic values in the first region and the second region respectively, determining frequency characteristics of the region by comparing the first peak value and the second peak value, estimating a lines per inch (LPI) value of a halftone pattern with respect to the region by using a distance between a peak point and a reference point in the Hadamard space, calculating an angle corresponding to the peak point in the Hadamard space, and adaptively performing filtering on the region by using the LPI value and the calculated angle.

7. The image forming apparatus of claim 6, wherein the control unit is further configured to perform filtering according to the frequency characteristics of the region by using a Gaussian filter that is determined according to the estimated LPI value and the calculated angle and a filter that is applied based on a plurality of sub-blocks having a size changed according to the estimated LPI value.

8. The image forming apparatus of claim 6, wherein the control unit is further configured to estimate the LPI value by using a coordinate of the frequency band corresponding to the selected first peak value and the selected second peak value in the Hadamard space and the number of pixels of each side of the Hadamard space.

9. The image forming apparatus of claim 6, wherein the control unit is further configured to perform filtering by using a Gaussian filter having a coefficient that is determined according to the estimated LPI value and the calculated angle, according to the determined frequency characteristics of the region.

* * * * *